Figures 1, 2:
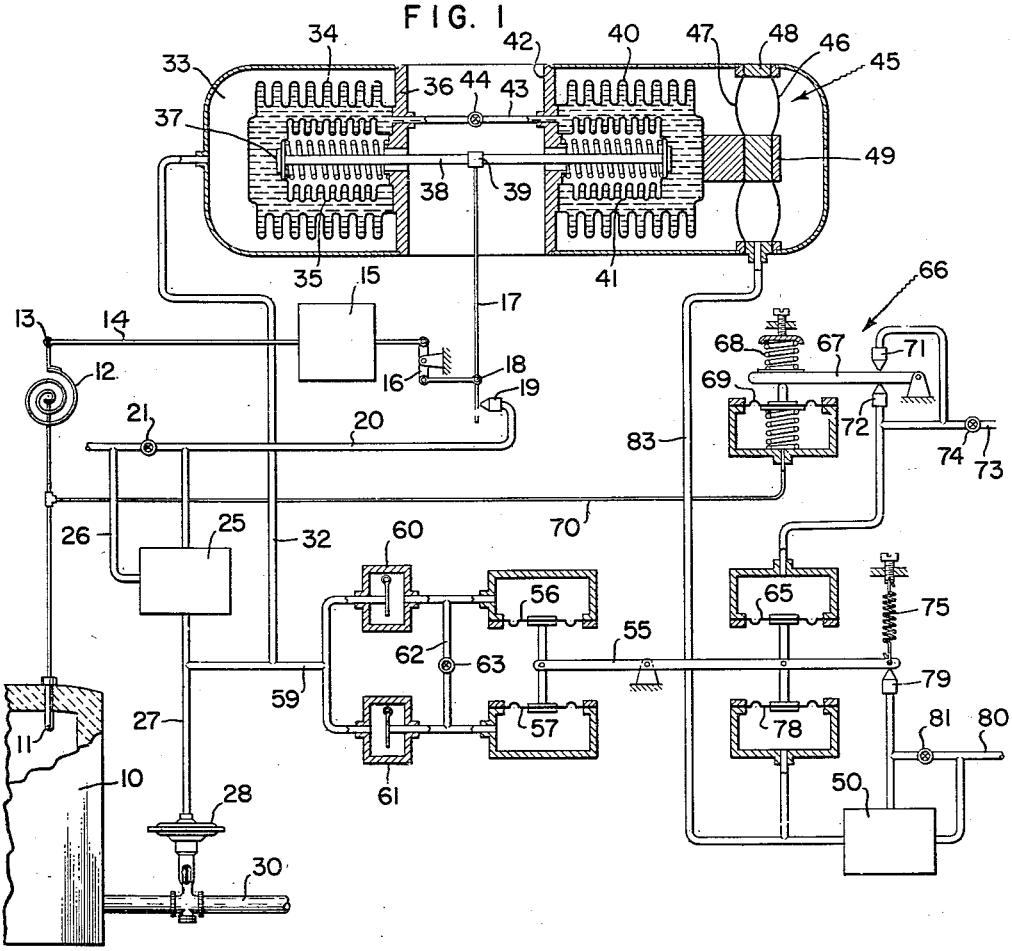

Nov. 6, 1956

R. C. DU BOIS 2,769,453

SELF ADJUSTING PNEUMATIC CONTROL APPARATUS

Filed Oct. 8, 1954

INVENTOR.
Robert C. Du Bois

BY Arthur H. Swanson

ATTORNEY.

United States Patent Office 2,769,453
Patented Nov. 6, 1956

2,769,453
SELF ADJUSTING PNEUMATIC CONTROL APPARATUS

Robert C. Du Bois, Fairfield, Conn., assignor to Minneapolis-Honeywell Regulator Company, Minneapolis, Minn., a corporation of Delaware Application October 8, 1954, Serial No. 461,102

15 Claims. (Cl. 137—86)

A general object of the present invention is to provide an improved apparatus for regulating the magnitude of a variable. More specifically, the present invention is concerned with an automatic controller for regulating the magnitude of a variable with means being provided for automatically adjusting the controlling action of the controller to achieve a high degree of stability and a desired optimum control action in the overall control loop which includes the controller.

Automatic controllers for regulating the magnitude of some controlled variable have long been used in numerous types of processes. A typical type of automatic controller of the pneumatic type will be found in the patent to C. B. Moore, No. 2,125,081, issued July 26, 1938. This controller is of the type which incorporates means for varying the gain or proportional band of the controller as well as the reset action of the controller. The term "reset action" is here used to designate that action which the controller takes to change its output in a variable correcting direction when the variable continuously deviates or droops from a predetermined set point. The proportional band and reset of the Moore type apparatus are adjusted manually to suit the particular process which is under control. Frequently, the variables affecting the process may shift or change and one particular set of proportional band and reset adjustments will not always provide the optimum control action. Consequently, the operator generally adjusts the controller to a point where it will not be subject to instability under all expected process changes. This is accompanied by a loss of optimum control under certain operating conditions and hence the effectiveness of the controller is lessened and the process operating efficiency is lessened.

The present invention is concerned with providing means which will automatically adjust the controlling action of the controller to a desired optimum operating condition. In other words, the present invention illustrates a form of self-adjusting controller which automatically adjusts its controlling action in accordance with an indication of a deviation of the process from a desired operating state. This deviation may be represented by a steady state offset of the control variable from a desired set point value or by an oscillation of the control process.

The control adjusting component of the present invention is a variable gradient spring of the fluid type. This spring is attached to the controller in such a manner as to effect adjustment of the reset and the proportional band settings of the controller. A variable control fluid pressure for the spring is developed by means indicative of an undesired deviation in the process or the controlling action of the controller.

It is accordingly a more specific object of the present invention to provide an improved self adjusting controller which incorporates an automatically adjustable gradient spring for effecting a change in the controlling action of the controller.

Another more specific object of the present invention is to provide an improved controller employing a fluid spring which has a fluid pressure supplied thereto in accordance with means indicative of an oscillatory condition in the control process or in accordance with the steady state offset of the control variable of the process from a desired set point value.

Still another object of the present invention is to provide a variable gradient spring for a controller having a follow up means and slow acting means for slowly removing the follow up effect of the controller with the variable gradient spring connected to the controller to adjust the follow up action as well as the rate of removal of the follow up action.

A further object of the invention is to provide a fluid spring for a controller which is supplied with a pressure indicative of the amplitude of oscillation of a variable associated with the process.

The various features of novelty which characterize the invention are pointed out with particularity in the claims annexed hereto and forming part of the specification. For a better understanding of the invention, its advantages, and specific objects attained with its use, reference should be had to the accompanying drawings and descriptive matter in which is illustrated and described a preferred embodiment of the invention.

Of the drawings:

Fig. 1 represents a schematic showing of the pneumatic control system wherein proportional band and reset adjustments are accomplished in accordance with the principles of the present invention; and Fig. 2 shows a modified form of a portion of the apparatus of Fig. 1 wherein only a proportional band adjustment is accomplished.

Referring first to Fig. 1, the numeral 10 represents a furnace wherein it is desired to maintain a particular temperature condition. It should be noted that while the invention is explained with respect to a temperature condition, this is for illustrative purposes only and many variables may be controlled by the controller as will be readily apparent upon considering the discussion which follows. Sensing the temperature of the furnace 10 is a suitable thermal bulb 11 which is connected to supply a pressure to a suitable spiral 12. The end 13 of the spiral 12 is connected to a link 14 which leads to a suitable mechanism 15 which may be used to select the zero and set point of the controller of the apparatus. The form of the linkage and adjusting mechanism 15 may well be of the type disclosed in the above-mentioned Moore patent. The linkage 16 in the form of a bell crank is used to connect linkage 15 to the flapper member 17 at 18. The flapper has cooperating therewith a suitable nozzle 19 which is supplied with fluid under pressure by way of a conduit 20, the latter having an adjustable restriction 21 in series therewith. The back pressure in the conduit 20 from the nozzle 19 is applied to a suitable pneumatic relay 25 which is supplied with air under pressure by a conduit 26. The output pressure of the relay 25 is fed to a conduit 27 to a suitable control valve 28 which is positioned in the fluid flow line 30 which leads to the furnace 10.

The output pressure from the relay 25 is also fed through a conduit 32 to a chamber 33. This chamber 33 includes a bellows 34 which is sealed and has positioned therein a further spring loaded bellows 35. The space between the bellows 34 and 35 is filled with a liquid. Both of the bellows units 34 and 35 are sealed to a supporting member 36. The end of the bellows 37 which is opposite the supporting member 36 is rigidly attached to a rod 38, the latter of which is fastened at 39 to the flapper member 17.

For producing an opposing force on the rod 38, there is provided a further pair of bellows units 40 and 41, the latter of which is inside of the bellows 40 and is spring loaded. The left end of both of the bellows units 40 and 41 are rigidly fastened to a supporting member 42 and the space between the bellows units is filled with a liquid. The space between the bellows units 34 and 35 is connected with the space between the units 40 and 41 by means of a passage 43 having an adjustable restriction 44 connected therein. Connected to the right end of the bellows 40 is a suitable pneumatic spring 45 which comprises a pair of diaphragms 46 and 47 rigidly attached to the frame at the outer circumference thereof at 48 and to the end of the bellows 40 by a suitable supporting structure 49. This diaphragm spring 45 is supplied with a pressure produced by a pneumatic relay 50. The pressure condition developed by the relay 50 is indicative of the presence or absence of a deviation in the control process.

The process deviation sensing portion of the present invention includes a pivoted beam 55 which has a pair of diaphragm units 56 and 57 exerting opposed pressure forces on the beam 55. The pressure conditions for the diaphragms 56 and 57 are developed from the pressure condition in the conduit 27 and is fed to the diaphragms 56 and 57 by way of a conduit 59, a check valve unit 60, and a further check valve unit 61 which supply an air pressure to the chambers enclosed by the diaphragms 56 and 57 respectively. The chambers enclosed by the diaphragms 56 and 57 may be suitably inter-connected by a conduit 62 having an adjustable restriction 63 in series therewith.

The beam 55 also has applied thereto a pressure force from a chamber which is enclosed by a diaphragm unit 65. This diaphragm receives its control pressure from a steady state deviation sensing mechanism 66. This mechanism includes a pivoted beam 67 which has applied to the end thereof a pressure force developed by a spring unit 68 which is representative of the set point of the process. Opposing the spring 68 is a force developed by the diaphragm unit 69 which is supplied with a variable pressure by a conduit 70 which leads to the temperature sensing bulb 11. A pair of nozzles 71 and 72 are positioned on opposite sides of the beam 67 and are supplied with air by way of an input conduit 73 and an adjustable restriction 74.

The beam 55 also has applied thereto a spring developed force which is produced by an adjustable spring 75. A further force on the beam 55 is produced by a diaphragm 78 which encloses a chamber which is supplied by a pressure condition produced by the output relay 50. The relay 50 in turn receives its controlling pressure from a nozzle 79 which cooperates with the beam 55 in a flapper-nozzle configuration to supply a variable pressure to the relay 50. Pressure is supplied to the nozzle 79 by way of a conduit 80 and a variable restriction 81.

In considering the operation of Fig. 1, the operation will be considered first without the self adjusting control features. It is first assumed that the apparatus is in a balanced state as it is shown in Fig. 1. When in a balanced state, the temperature within the furnace 10 will be of the desired magnitude and the air pressure controlling the valve 28 will also be at such a magnitude as to maintain the proper amount of fuel flow to the furnace 10 to maintain the temperature constant.

Should the temperature within the furnace 10 decrease, it is desired that additional fuel be added to the furnace so as to bring the temperature back to the desired value. A temperature decrease will be evidenced by a drop in the pressure produced by the thermal bulb 11 and this drop in pressure will cause the spiral 12 to move its end 13 toward the left or counter-clockwise. This counter-clockwise movement will be fed through the link 14, zero mechanism 15, link 16 to the flapper 17, and the flapper 17 will be moved toward the right against the nozzle 19. Moving the flapper 17 against the nozzle 19 will increase the back pressure in the nozzle 19 and there will be an increased pressure signal fed into the relay 25. The relay 25 will also produce an increased pressure change which is to be fed to the conduit 27 to the valve 28 so that the valve 28 will open. When the pressure in the output of the relay 25 increases, the pressure is also fed through the conduit 32 to the chamber 33. Since the chamber 33 is enclosed, the bellows 34 will tend to be compressed by the increased pressure in the chamber. This compression force is transferred to the bellows unit 35 and this bellows unit will tend to move toward the right and carry with it the rod 38. Movement of the rod 38 toward the right will move the flapper 17 away from the nozzle 19 and thereby provide a follow-up action for the flapper so as to reduce the nozzle back pressure. The nozzle back pressure will accordingly stabilize out at some increased pressure value which will tend to maintain an increased amount of fuel flowing into the furnace 10. When the temperature has gone back to the desired value, the spiral 12 will be moved away from the nozzle 19 so as to decrease the pressure from the nozzle and the pressure from the relay 25. The decreased pressure will be effective to close the valve 28 by a predetermined amount. The decrease will also be fed through the conduit 32 to the chamber 33 where the reduced pressure causes the rod 38 to be moved to the left and the flapper 17 adjacent the nozzle 19 to be moved in a pressure increasing direction. Under normal conditions, the apparatus will stabilize out at the starting point.

If there should be steady or continuous offset between set point and variable in the apparatus, it is desired that the controller reset the output control pressure to the valve 28 in such a manner as to eliminate the offset. The bellows units 40 and 41 provide a resetting mechanism for the present controller and this mechanism is effective to slowly eliminate the rebalancing effect normally accomplished by the bellows units 34 and 35. This resetting effect is produced by the pressure condition between the bellows 34 and 35 being dissipated into the space between the bellows 40 and 41 by way of the passage 43 which has the restriction 44 therein. Thus, if there should be an increase pressure condition in the chamber 33 which is continuous over a period of time, the initial reaction to this pressure increase will be to deflect the follow-up rod 38 toward the right. However, as the pressure on the liquid between the bellows units 34 and 35 begins to dissipate into the space between the bellows units 40 and 41, the force exerted on the rod 38 which moves it towards the right will be decreased. Thus, over a period of time, the rod 38 will always tend to come back to a neutral position and the pressures acting upon the bellows 35 and 41 will tend to be balanced. The rate at which this balancing takes place between the follow up and the reset bellows will be dependent upon the amount of resistance or restriction presented by the restriction 44.

The operation of the apparatus as described thus far has been illustrative only of the type of operation obtainable with apparatus of the type disclosed in the above-mentioned Moore patent. Reference should be had to the Moore patent for a more complete disclosure of the operation of the apparatus and the details relative to the structure thereof.

As mentioned above, the present apparatus includes means for achieving a self adjusting configuration in the form of the fluid spring 45 which is supplied with a pressure indicative of the presence or absence of undesirable deviations in the process or in the control action of the controller on the process. The diaphragm spring 45 has its gradient adjustable in accordance with the pressure applied to the inside thereof. When there is a high pressure supplied to the spring, the gradient of the spring will be high. Conversely, if the pressure inside the spring is decreased, the gradient of the spring will be decreased. In other words, when the pressure applied to diaphragms 46 and 47 is increased, the diaphragms stretch outwardly and cause the center member 49 to be more firmly held in its central position. When held in this manner, a greater force is required to displace the member 49. Thus, the stiffness or gradient of the spring is varied.

Before considering the specific functioning of the fluid spring 45, it should be noted that when there is an oscillation in the process as evidenced by an oscillation in the measured variable, or in the control pressure fed to the control valve, there is a need for decreasing the gain of the controller. The decreasing of the gain is sometimes referred to as a widening of the proportional band of the controller. In other words, when the gain of the controller is low, a unit change of magnitude in the input variable will produce a smaller output pressure change at the control valve than would be achieved if the gain of the controller were high. Further, when there is an oscillation present in the system, the oscillation may be eliminated by changing the reset rate. The direction of change is generally in a rate decreasing direction so as to prevent the apparatus from eliminating the follow up of the controller prematurely and instigating a further instability.

In the event that there is a steady state offset, it is desired that the apparatus be changed in its controlling action to eliminate this offset. The elimination of a steady state offset is generally accomplished by increasing the reset rate and narrowing the proportioning band or increasing the gain of the controller.

The fluid spring as used in Fig. 1 is effective to change both the proportional band or gain and the reset rate of the controller. When the pressure within the spring is low, the gradient of this spring will be low and therefore will exert substantially no restraining force upon the end of the bellows 40 as the bellows tend to move due to the controlling action of the controller. This will be effective to widen the proportional band of the controller and to decrease the reset rate. The widening of the proportional band will be apparent when it is noted that the follow up action upon the rod 38 by the bellows 35 is normally restrained by the bellows 41. If there is no substantial restraining force upon the bellows 40 surrounding the bellows 41, the bellows 41 will be free to move toward the right so that there will be a relatively large follow-up action upon the flapper 17. Insofar as the reset rate adjustment is concerned, it will again be noted that the ability of the bellows 41 to force the rod 38 back in a balance eliminating direction will be dependent upon how rigid the right end of the bellows 40 is maintained. If the bellows 40 is not restrained at its outer end, the bellows 41 will not be subjected to as large a pressure force tending to move the rod 38 in a balance removing direction. This has the effect of appearing as a decreased rate of reset action.

If the gradient of the fluid spring 45 is increased, the signal changes noted in the controlling action above are just reversed. In other words, the higher spring gradient will cause an increase in the rate of reset due to the fact that the bellows 41 is now constrained from movement at its right end and the pressure change is transferred to the bellows 41. Further, the proportional band or gain is narrowed which in effect requires that there be a larger pressure change in the output for a unit change in input variable.

The operation of the apparatus with its self adjusting features considered is first analyzed from the standpoint of an oscillatory condition in the process. An oscillatory condition in the process may be evidence either by an oscillation of the control variable as sensed by the bulb 11 or by an oscillatory condition of the pressure feeding the valve 28. The latter is selected in the present apparatus in that the amount of control signal available is generally larger than that available at the sensing element 11 and it is further possible to detect an instability at the valve 28 prior to its becoming effective in the variable sensing element 11. With an oscillatory condition present in the conduit 27 feeding the valve 28, this oscillatory pressure will be fed through the conduit 59 to the check valve units 60 and 61. The high pressure signal will be passed through the check valve 60 while the low pressure will be passed through the check valve 61. This will establish on the diaphragms 56 and 57 a differential pressure which is proportional to the amplitude of the oscillatory signal present in the line feeding the valve 28. There will be a resultant pressure force upon the beam 55 tending to rotate the beam in a counter-clockwise direction. This will mean that the beam 55 at its right end will move away from the nozzle 79 and there will be lowering of the back pressure in the nozzle and consequently a lowering of the pressure on the output of the relay 50. A rebalancing action will take place due to the action of the diaphragm 78 acting upon the beam 55. The decrease in pressure will also be applied by way of the conduit 83 to the fluid spring 45 so as to decrease the gradient of the spring as it acts upon the bellows 40. As pointed out above, the decrease in the spring gradient has the effect of widening the proportional band and decreasing the rate of reset of the controller. This adjustment will return stability to the controller and to the process and the oscillation will cease.

In the event that there is a steady state offset or drooping of the control variable from the desired set point, it is desired that the proportional band be narrowed and the rate of reset be increased. As mentioned above, this may be accomplished by increasing the spring gradient of the fluid spring 45. The offset sensing mechanism 66 provides the pressure signal for effecting an increase pressure signal in the fluid spring 45. As long as the beam 67 of the apparatus 66 is centered between the nozzles 71 and 72, there will be a minimum low pressure applied to the diaphragm 65 associated with the beam 55. The beam 67 will be centered so long as the spring force 68 representing the set point is equal to and opposite the force presented by the diaphragm 69 which represents the magnitude of the control variable. When so centered, the air issuing from each of the nozzles 71 and 72 will be at a maximum value so that the pressure on diaphragm 65 will be low. If the magnitude of the variable should deviate above or below the desired value, the beam 67 will be moved upward or downward and there will be an accompanying increase in the pressure acting upon the diaphragm 65. This pressure force acts upon the beam 55 to rock the beam in a clockwise direction so that the right end of the beam moves adjacent the nozzle 79 and increases the back pressure in the nozzle 79. This increase in back pressure is fed through the relay 50 and the conduit 83 to the fluid spring 45 so as to increase the spring gradient thereof. As pointed out above, the increase in spring gradient increases the rate of reset and narrows the proportional band which means that the overall sensitivity of the apparatus will be increased and the offset will be eliminated.

It will be readily apparent from the foregoing description that the apparatus of Fig. 1 is a self adjusting controller which adjusts both proportional band and reset so as to obtain optimum operation of the process controlled by the controller.

The apparatus shown in Fig. 2 is a modification of the Moore patent apparatus and is arranged so that the self adjustment is accomplished only with respect to the proportional band or gain of the controller. Corresponding components between Figs. 1 and 2 carry corresponding reference characters.

The fluid spring in this figure is identified by the numeral 90 and it comprises a pair of diaphragm units 91 and 92 which correspond to the diaphragm units 46 and 47 of the fluid spring 45. The fluid spring 90 is coupled to the link 94 which is between the inner bellows units 35 and 41. The connection of these units to the spring 90 is at 95. The link 94 connects to the flapper 17 in the same manner that link 38 is connected to the flapper 17. Added to the bellows unit 40 on the external side thereof is a suitable biasing spring 96. The remaining components which should normally be associated with the apparatus of Fig. 2 may correspond to that shown in Fig. 1.

By placing the fluid spring 90 directly on the connecting rod 94, it is possible to exert a direct restraining force upon the member 94 as it normally tends to move the flapper 17 in a rebalancing direction. When the high pressure signal is fed through the input conduit 83 to the fluid spring 90, the gradient of the spring will be increased and it will resist the forces acting upon the rod 94 tending to move the flapper in a balancing direction. This has the effect of narrowing the proportional band of the controller.

If the pressure fed to the fluid spring 90 is decreased, there will be a smaller resistance force acting upon the rod 94 and consequently the proportional band of the controller will be widened.

The pressures supplied to the fluid spring 90 may be derived in the manner in which they are derived in Fig. 1 or by any other suitable apparatus which will indicate and differentiate between oscillatory instabilities and instability evidenced by a continuous offset.

While, in accordance with the provisions of the statutes, there has been illustrated and described the best forms of the invention known, it will be apparent to those skilled in the art that changes may be made in the form of the apparatus without departing from the spirit of the invention as set forth in the appended claims, and that in some cases certain features of the invention may be used to advantage without a corresponding use of other features.

Having now described the invention, what is claimed as new and for which it is desired to secure Letters Patent is:

1. Apparatus for regulating a variable comprising a controller for producing an output control action which follows proportionally the magnitude of an input variable, controller sensitivity changing means connected to said controller, said changing means comprising a pneumatic spring, and means responsive to an aperiodic variation of the input variable connected to supply a pneumatic pressure to said fluid spring to increase the sensitivity of said controller.

2. Apparatus for regulating a variable comprising a controller for producing an output control action which follows proportionally the magnitude of an input variable, controller sensitivity changing means connected to said controller, said changing means comprising a pneumatic spring, and means responsive to a periodic variation of the regulating apparatus to supply a pneumatic pressure to said fluid spring to decrease the sensitivity of said controller.

3. A controller for a variable comprising means for producing an output control action proportional to the magnitude of a variable, means for integrating a deviation of the variable from a predetermined value and modifying the output controlling action in accordance with the integrating action of said means, a variable fluid spring connected to said controller to regulate the integrating action of said means, and means indicative of a need for a change in the rate of integration of said integrating means connected to supply a variable fluid pressure to said fluid spring.

4. Self adjusting mechanism for a controller comprising, a fluid spring whose gradient is variable in accordance with the magnitude of an applied pressure, means connecting said spring to a controller to modify the controlling action thereof, and means indicative of a process deviation connected to supply a pressure signal to said spring which varies in accordance with the type and extent of the process deviation.

5. In a pneumatic controller, the combination comprising, a pneumatic follow up element, a delayed action follow up cancelling element, an adjustable gradient spring connected to said follow up cancelling element to vary the effect of both said elements, and means indicative of of a deviation in the controlling action of the controller connected to vary the gradient of said spring.

6. A self adjusting controller comprising, a flapper-nozzle apparatus which is adjustable in accordance with the magnitude of a controlled variable to produce an output controlling pneumatic pressure, balancing means for the flapper-nozzle comprising a first pneumatic means connected to adjust the flapper-nozzle relation in a follow up direction, a second means slowly acting in opposition to said first pneumatic means to remove the balancing action of said first pneumatic means, a rigid connection between said first pneumatic means and said second means, and a fluid spring connected to exert a controllable restraining force on said rigid connection.

7. Apparatus as defined in claim 6 wherein the gradient of said fluid spring is varied by a fluid pressure produced by means indicative of a deviation in a variable regulated by said controller.

8. A self adjusting controller comprising, a flapper-nozzle apparatus which is adjustable in accordance with the magnitude of a controlled variable to produce an output controlling pneumatic pressure, balancing means for the flapper-nozzle comprising a first pneumatic means connected to adjust the flapper-nozzle relation in a follow up direction, a second means slowly acting in opposition to said first pneumatic means to remove the balancing action of said first pneumatic means, a fluid spring operatively arranged to exert a controllable restraining force on said second means, and means connected to said fluid spring to vary the fluid pressure therein in accordance with a deviation in a variable regulated by said controller, said fluid spring being operative to vary the follow up action of said first pneumatic means and the rate at which said second means acts to remove the balancing action of said first pneumatic means.

9. A self adjusting controller comprising a fluid spring connected to vary the controlling action of the controller, and means for supplying a pressure to said fluid spring, said means comprising a flapper-nozzle apparatus having a force applied thereto which is proportional to the amplitude of a deviation of the controlling action of said controller from a predetermined norm.

10. A self adjusting controller comprising a fluid spring connected to vary the controlling action of the controller, and means for supplying a pressure to said fluid spring, said means comprising a flapper-nozzle apparatus having means for providing an increased output pressure to said fluid spring irrespective of the direction deviation of the controlled variable from a predetermined set point.

11. A self adjusting controller comprising a fluid spring connected to vary the controlling action of the controller, and means for supplying a pressure to said fluid spring, said means comprising a first flapper-nozzle apparatus having a force applied thereto which is proportional to the amplitude of a deviation of the controlling action of said controller and a second flapper-nozzle apparatus producing a modifying pressure force on said first flapper-nozzle apparatus in accordance with the deviation of a measured variable from a predetermined set point.

12. In a fluid controller, the combination comprising, controller adjusting means, and a controller action sensing means connected to said controller adjusting means, said controller action sensing means comprising a pivoted beam, a pair of opposed pressure sensing units connected to exert a pressure force on said beam, a forward check valve in series with the input of one of said pressure sensing units, a reverse acting check valve connected in series with the input of the other of said pressure sensing units, means connecting both of said check valves to a fluid pressure source indicative of controller action, and means indicative of applied force to said beam to supply a controller adjusting signal.

13. Apparatus as defined in claim 12 wherein said pair of opposed pressure sensing units are connected by a passage having a controlled restriction therein.

14. Apparatus for regulating a variable comprising a proportional controller having balancing means and means for slowly removing the balancing action of the balancing means, means responsive to a predetermined deviation in the operation of the controller, and a unitary controller adjusting means connected to said controller to simultaneously regulate the effect of said balancing means and said balance removing means, said unitary adjusting means being connected to said deviation responsive means and controlled thereby.

15. Apparatus as defined in claim 14 wherein said unitary adjusting means comprises a fluid spring.

References Cited in the file of this patent

UNITED STATES PATENTS

| | | |
|---|---|---|
| 2,125,081 | Moore | July 26, 1938 |
| 2,163,982 | Mercier | June 27, 1939 |
| 2,441,405 | Fitch | May 11, 1948 |
| 2,452,176 | Bent | Oct. 26, 1948 |
| 2,638,921 | Caldwell | May 19, 1953 |
| 2,655,384 | Peterson | Oct. 13, 1953 |